March 5, 1935. G. BORGNA 1,993,131
CHANGE SPEED DEVICE
Filed Jan. 27, 1933 2 Sheets-Sheet 2
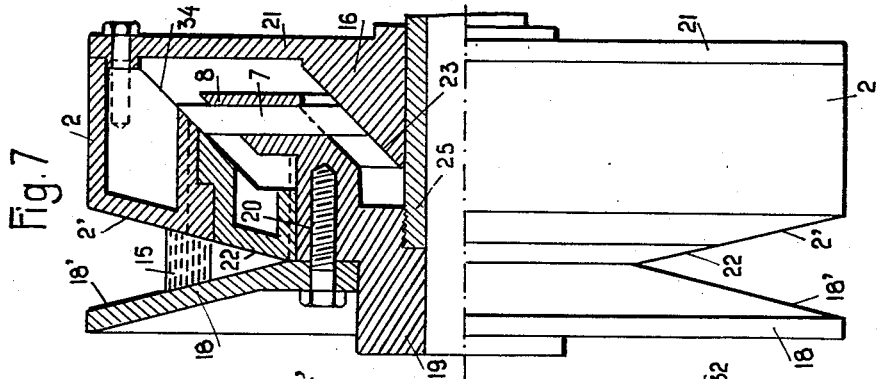
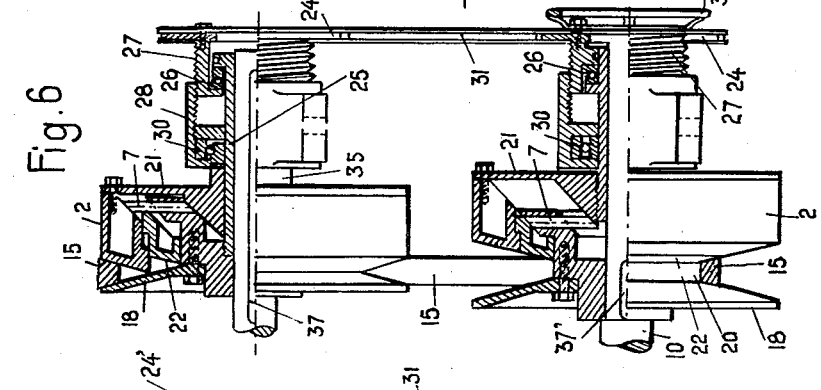
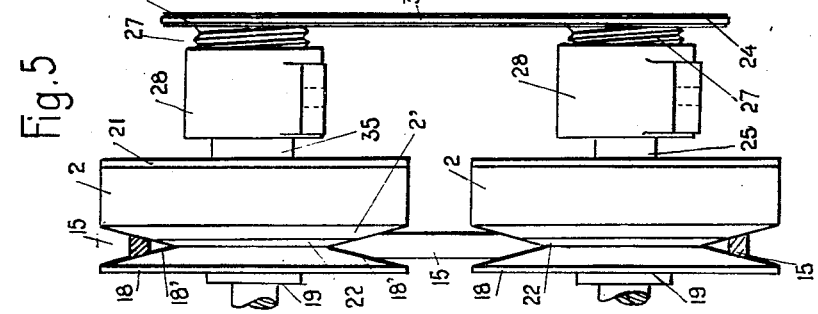
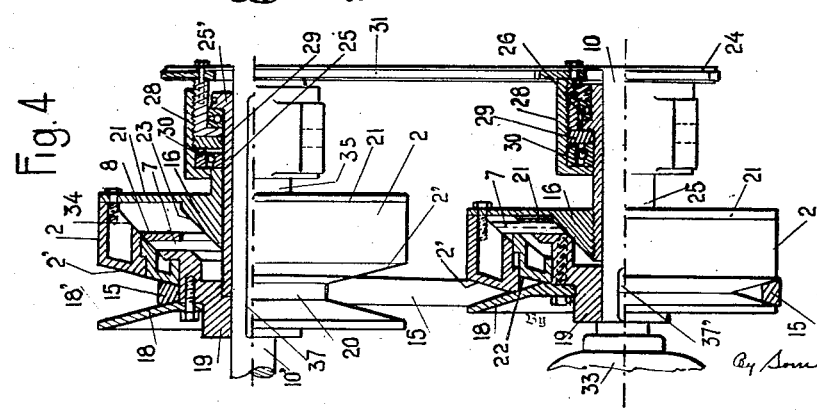
Inventor
Giulio Borgna
By Sommers & Young
Attorneys Patented Mar. 5, 1935

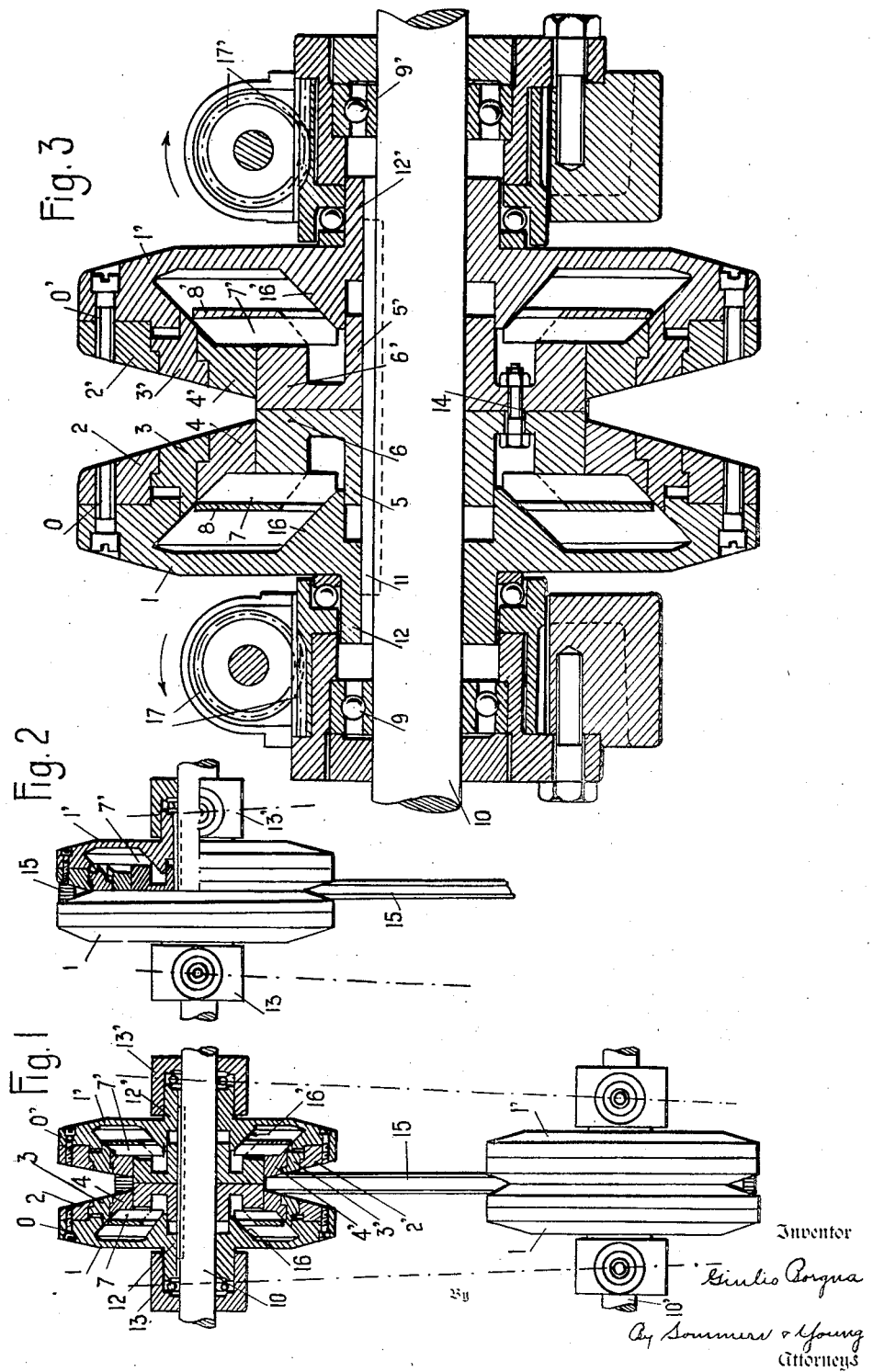

1,993,131

UNITED STATES PATENT OFFICE 1,993,131

CHANGE SPEED DEVICE

Giulio Borgna, Pinerolo, Italy

Application January 27, 1933, Serial No. 653,916
In Italy February 4, 1932

1 Claim. (Cl. 64—8)

The invention relates to a new change speed device for transmissions in which movable disc pulleys and trapezoidal belts are used. The invention employs conical surfaces formed by the combination of two or more concentric conical rings axially displaceable, by which it is possible to use belts of ordinary width and without transverse strengthening pieces for transmitting considerable power, with the result of a corresponding diminution of the width of the pulleys and consequently of the whole device, as well as a better utilization of space and a smaller cost.

The figures of the annexed drawings illustrate only by way of example two manners of applying this invention.

Fig. 1 is a side elevation partially in section of a first form of construction comprising a pair of pulleys constructed according to the invention, and having a trapezoidal belt at work in the position corresponding to the smallest diameter of the driving pulley, and Fig. 2 shows the same driving pulley with the belt at work in its greatest diameter. Fig. 3 shows on a larger scale in longitudinal section a complete pulley in the position corresponding to the belt working in the smallest diameter of the pulley, and with a diagrammatic view of the device which operates the displacement of the two halves of the pulley.

Fig. 4 shows partially in side elevation and partially in longitudinal section another form of construction of the pulleys, in which only one half of each pulley is provided with concentric axially displaceable conical rings, the pulleys being in the position corresponding to the greatest speed of the driven pulley. Fig. 5 is a side elevation of the same couple of pulleys with the belt in its middle position. Fig. 6 shows the same couple of pulleys partially in side elevation and partially in longitudinal section, whereby the two pulleys have the belt in the position corresponding to the smallest speed of the driven pulley. Fig. 7 shows on a larger scale, partially in side elevation and partially in longitudinal section the driven pulley with the belt in the position corresponding to the middle speed of the same.

With reference to the first embodiment (Figs. 1, 2, 3), each pulley is formed by a pair of discs 1, 1' which serve as supports for a plurality of concentric conical rings 2, 3, 4, 2' 3' 4', of which the first pair 2, 2' is fixed, for instance by means of screws 0, 0' to the said discs 1, 1'. The other conical rings 3, 4 3', 4' are axially displaceable in regard to each other and to the discs 1, 1', while they are solidly connected with the shaft in regard to rotation. The discs 1, 1' are mounted on the shafts 10, 10' by means of their hubs 12, 12' and can slide along the same being guided by the key 11. The said hubs are provided with thrust ball bearings 9, 9' inside the sleeves 13, 13' which are independent of the rotation of the shafts, but which can be displaced by means of a special device which is diagrammatically shown in the drawings. In the middle line between the hubs 12, 12' is fixed to the shaft a sort of inner pulley formed by two halves 6, 6', whose cylindrical surface serves as pulley of smallest diameter for the trapezoidal belt 15 as well as a guide for the conical rings 4, 4', these halves being connected together by bolts 14. Each of the halves 6, 6' is provided with extensions 8, 8' in which are made a suitable number of holes which serve as guides for a number of cylindrical pins 7, 7' whose ends are bevelled at 45° for engaging themselves above and below with the corresponding conical surfaces, also inclined at 45°, of the rear part of the said conical rings and of the internal parts 16, 16' of the hubs 12, 12'.

With reference to the second example (Figs. 4, 5, 6, 7), it may be seen that the pulleys, instead of being formed by two halves symmetrically arranged and both provided with the axially displaceable conical rings, are formed by two halves which are different from one another, of which one 18 is provided with a conical surface 18' in a single piece and is suitably fixed to a hub 19 which has a cylindrical prolongation 20 forming the bottom of the groove of the pulley, while the other half, supported by the disc 21, has a conical surface formed by the combination of the said conical rings, the first of which, 2, 2', is fixed to the edge of the disc 21, while the other, of which for simplicity only one is shown, 22, are displaceable relative to the cylinder 20 and relative to each other.

As in this mode of construction, for the regular working of the device it is necessary that the belt may always displace itself in a parallel manner, one of the halves of each pulley is fixed to the shaft, while the other one is movable; that is to say, in the driving pulley the half pulley which is provided with the whole conical surface is fixed to the driving shaft 10, while the other half, which is provided with the conical rings, is movable: on the contrary, in the driven pulley that half pulley with the whole conical surface is movable, while the half provided with concentric conical rings is in a fixed position.

The displacement of the movable halves takes place by means of sleeves 25 which are slidable on the shafts 10, 10', one end of the sleeve of the drive pulley being screwed to the hub 16 of the disc 21, while the sleeve 25 of the driven pulley is screwed to the hub 19 of the disc 18 thereof. The other end of sleeve 25 of the driven pulley is placed inside the support 28 and is provided with a collar 25', which by means of a thrust ball bearing 26 is combined with another sleeve 27 whose threaded surface engages itself with the corresponding threaded hole of the support
28. Keys placed in slots 37 of the shaft 10 and 10' permit the axial displacement of the sleeves 25.

A thrust ball bearing 30, fixed by means of a ring 29 is placed at the bottom of the hole of each support 28.

At the free end of the threaded sleeves 27 of the driving pulley and of the driven one is fixed a pair of chain wheels 24, 25' connected together by a chain 31.

To the free end of the sleeve 27 of the driving pulley is also fixed a hand wheel 32 which serves to operate the simultaneous displacement of the movable halves of the driving pulley and of the driven one.

In the driving pulley the rear part of the disc 21 is without projection in order to permit the same to be displaced axially until against the end surface of the support 28, while in the driven pulley, in which the disc 21 is not movable, it is provided with a projection 35 for maintaining the right distance from the corresponding support 28.

The hub 16 of the disc 21 is provided inside with a conical surface 23 inclined at 45° and on the same lie and are guided the lower ends of the cylindrical pins 7, which are radially guided in holes made in an extension 8 integral with the cylinder 20, while the upper ends of the said pins 7 are in contact with the conical rear surfaces of the axially displaceable conical rings.

It is to be noted that in the devices for great speed changes, the pins 7, instead of being perpendicular and radially arranged in regard to the shaft 10 and 10', are preferably inclined towards the axis of the trapezoidal belt at 60° or 45°, in which case the inclination of the conical surface of the hub must be modified to 30° and 15°.

The shaft of the driving pulley receives directly its movement for instance from an electric motor 33 or in other suitable manner, so that the said system of pulleys may be employed for the working of shaping machines, planing machines, or for other kind of machine tools, as well as for any other kind of machines, such as for instance, machines for paper manufacture, in which abrupt speed changes incident to shifting are desirable.

The working manner of the new system of movable grooved pulleys according to the present invention is as follows:
With regard to the first example, (Figs. 1, 2, 3), and supposing that the driving pulley 1, 1' mounted on the driving shaft 10 is in the position of its greatest enlargement (Fig. 1), if it is desired to increase the speed of the driven shaft, it is sufficient to exercise a movement of the sleeves 13, 13' one towards the other, which may be obtained for instance by means of the device with worm gear 17, 17', and to move the corresponding sleeves 13, 13' of the driven pulley from each other. In consequence of this displacement the conical hubs 16, 16' of the discs 1, 1' are inserted under the series of guided pins 7, 7', causing a radial displacement of the pins and a corresponding pressure on the rear of the conical rings 4. 4' which are obliged to displace themselves till to the moment in which they come in contact with each other in the middle line, and as a result the trapezoidal belt is compelled to rise, which is rendered possible by the simultaneous corresponding enlargement of the discs 1, 1' of the driven pulley. By continuing this movement of the sleeves 13, 13', the pins 7, 7' continue their radial travel, but will now displace only the rings 3, 3' until they come in contact with one another. Finally the discs 1, 1' displace themselves till their fixed conical rings 2, 2' come in contact, and in this manner the trapezoidal belt will reach the greatest diameter in the driving pulley, while at the same time it will reach the smallest diameter in the driven pulley and will bear against the internal pulley 6, 6'.

It is obvious that the belt 15 during this rising movement will not be hindered by the steps formed in the groove of the pulley, because before the immediately superior step be formed, the belt will be already on this step.

By diminishing the pressure on the sleeves 13, 13' of the driving pulley the contrary result will be obtained, because the belt in consequence of its wedgeshaped form will produce the enlargement of the conical surfaces of the rings 2, 3, 4 2' 3' 4', which rings will displace themselves the one after the other, beginning from the superior ones, so that they present continually to the belt a conical surface without jumps in those moments in which the belt must pass above the union line between a conical ring and the following one.

With regard to the second example (Figs. 4, 5, 6, 7), and supposing that the device is in the position shown in Fig. 4, if the hand wheel 33 is turned counter-clockwise, the chain wheels 24, 24' cause the unscrewing of the threaded sleeves 27 from the corresponding holes of their supports 28, but with a different result for each pulley, because in the driving pulley the disc 21 provided with conical rings is displaced to the right until it comes into contact with the corresponding support 28 (Fig. 6), while at the same time in the driven pulley the sleeve 25 being screwed to the hub 19 of the disc 18 having the whole conical surface, the same will be drawn to the right, until it comes into contact with the lower corner of the upper fixed ring 2, 2', in which position the trapezoidal belt 15 corresponds to the greatest working diameter of the driven pulley and consequently to the smallest speed of the same.

By turning the hand wheel 32 in the opposite direction, that is to say clockwise, the gradual return of the two pulleys to the initial position shown in Fig. 4 will be obtained.

During this working, the manner of displacement of the conical rings and of the radial pins is precisely the same as explained for the first example.

In cases of great transmissions of power, in which a single trapezoidal belt would not be sufficient, there is the possibility of coupling in series on the driving shaft and on the driven one, two or more of the said movable grooved pulleys, by combining the same in such a manner as to obtain the simultaneous displacement of the movable discs of each series of pulleys, and that by means of a single displacement device, arranged as in the case of a single couple of movable grooved pulleys, and operated by means of a single hand wheel mounted on the end of that threaded sleeve which corresponds to the driving pulley.

In case it is desired to perform the operation of the said displacement from a certain distance, an intermediate chain gear or the like may be used.

In Figs. 1, 2, 3 of the annexed drawings there is a case of pulleys composed of three couples of axially displaceable conical rings, and in the second example (Figs. 4, 5, 6, 7) only two such rings; but it is obvious that by changing the dimensions of the pulleys and of the trapezoidal belts, also a greater number of rings may be used.

I claim:

Change speed mechanism for power transmission comprising a shaft, a pulley wheel on said shaft, said wheel comprising a pair of halves having inclined faces toward each other forming a V-shaped groove therebetween, one of said halves being composed of a plurality of telescoping rings, a disc on the shaft, the outermost ring being fixedly secured on said disc, said disc having an axially inclined cam, a sleeve on the shaft and having a radial guide, a bolt in said guide and having its outer end inclined, the rings inside the outer ring having cams on their faces opposite the said inclined face of said pulley half, the outer inclined end of the bolt engaging the cams of said rings, and the cam of said disc engaging the inner end of the bolt, means for moving the disc axially toward the opposite half of the pulley whereby the outer ring and the cam of the disc are moved axially and the bolt is wedged outwardly against the cams of the rings inside the outer ring and said rings are moved axially, the extent of the end of said bolt being such that when an inner ring contacts the opposite half of the pulley the inclined outer end of the bolt clears said inner ring.

GIULIO BORGNA.